(12) United States Patent
Stubbs

(10) Patent No.: US 11,284,495 B2
(45) Date of Patent: *Mar. 22, 2022

(54) CLOSET LIGHTING SYSTEM

(71) Applicant: Luminook Lighting, LLC, Lawrence, KS (US)

(72) Inventor: Christopher Stubbs, Lawrence, KS (US)

(73) Assignee: Luminook Lighting, LLC, Lawrence, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/027,560

(22) Filed: Sep. 21, 2020

(65) Prior Publication Data

US 2021/0007199 A1 Jan. 7, 2021

Related U.S. Application Data

(63) Continuation of application No. 16/778,006, filed on Jan. 31, 2020, now Pat. No. 10,785,852.

(60) Provisional application No. 62/957,020, filed on Jan. 3, 2020, provisional application No. 62/947,089, filed on Dec. 12, 2019, provisional application No. 62/799,093, filed on Jan. 31, 2019.

(51) Int. Cl.
*H05B 47/115* (2020.01)
*H05B 47/19* (2020.01)
*H05B 47/18* (2020.01)

(52) U.S. Cl.
CPC .......... *H05B 47/115* (2020.01); *H05B 47/18* (2020.01); *H05B 47/19* (2020.01)

(58) Field of Classification Search
CPC ....... H05B 47/115; H05B 47/19; H05B 47/18
USPC .......................................................... 315/149
See application file for complete search history.

(56) References Cited

U.S. PATENT DOCUMENTS

| | | | | |
|---|---|---|---|---|
| 4,719,363 A * | 1/1988 | Gallacher | ............ | H05B 47/105 307/117 |
| 5,391,088 A * | 2/1995 | Tomchak | ............. | H01R 13/621 439/216 |
| 6,023,224 A * | 2/2000 | Meyvis | ................... | E05B 47/00 340/545.1 |
| 6,912,429 B1 * | 6/2005 | Bilger | ................. | G08B 25/008 700/19 |
| 7,045,764 B2 * | 5/2006 | Beggs | ....................... | E06B 9/13 250/221 |
| 7,411,174 B2 * | 8/2008 | Eash | ...................... | H05B 47/19 250/221 |
| 9,836,936 B1 * | 12/2017 | Brown | ............... | G06K 7/10356 |

(Continued)

*Primary Examiner* — Don P Le
(74) *Attorney, Agent, or Firm* — Kolitch Romano LLP

(57) ABSTRACT

A closet lighting system incorporates a light strip that extends around an inside perimeter of a closet doorway and is configured to automatically turn on when motion is detected in the doorway. Motion may be a closet door opening or a person moving into a closet doorway, either walking into or reaching in. A closet lighting system has one or more activity sensors to detect the motion in the closet doorway. A first activity sensor may be configured proximal to the control system or the connected end of the light strip to the controller. A second activity sensor may be configured on a distal end of the light strip and may send a motion signal through the light strip, such as through a data line or through a power line. A motion signal may a voltage signal passed through the power line below a voltage to activate the lights.

20 Claims, 4 Drawing Sheets

(56) References Cited

U.S. PATENT DOCUMENTS

| | | |
|---|---|---|
| 10,435,936 B2 | 10/2019 | Lietz et al. |
| 10,785,852 B1 | 9/2020 | Stubbs |
| 10,813,196 B1 | 10/2020 | Stubbs |
| 10,952,303 B1 | 3/2021 | Stubbs |
| 2006/0011111 A1* | 1/2006 | Stoddard .................. E05G 1/00 109/1 R |
| 2006/0086888 A1* | 4/2006 | Eash .................. F21V 23/0442 250/206 |
| 2006/0176697 A1* | 8/2006 | Arruda .................. H05B 47/13 362/276 |
| 2010/0296298 A1* | 11/2010 | Martin, Jr. ........... A47G 1/0622 362/311.06 |
| 2013/0009785 A1* | 1/2013 | Finn ........................ G08B 7/06 340/870.01 |
| 2014/0334139 A1 | 11/2014 | Smith |
| 2015/0163867 A1* | 6/2015 | Recker ...................... H02J 9/02 315/250 |
| 2015/0285489 A1* | 10/2015 | Ulysse .................. F21V 33/006 362/183 |
| 2016/0019736 A1 | 1/2016 | Radicella et al. |
| 2016/0047539 A1* | 2/2016 | Cano ...................... F21V 23/02 362/133 |
| 2016/0290617 A1 | 10/2016 | Nguyen |
| 2017/0122507 A1* | 5/2017 | Hoffman ................ F21V 23/06 |
| 2017/0223254 A1* | 8/2017 | Brinkman ................ E05F 7/00 |
| 2018/0306966 A1* | 10/2018 | Conrad .................... F21K 9/61 |
| 2019/0254136 A1* | 8/2019 | Brinkman ............. G06F 3/0202 |
| 2019/0346095 A1* | 11/2019 | Brown ................. E05F 15/668 |
| 2020/0029689 A1* | 1/2020 | Yao .................... F21V 23/0485 |

\* cited by examiner

CLOSET LIGHTING SYSTEM

CROSS REFERENCE TO RELATED APPLICATIONS

This application claims the benefit of U.S. provisional patent application No. 62/799,093, filed on Jan. 31, 2019, U.S. provisional patent application No. 62/947,089, filed on Dec. 12, 2019, and U.S. provisional patent application No. 62/957,020, filed on Jan. 3, 2020; the entirety of all three are hereby incorporated by reference herein.

BACKGROUND OF THE INVENTION

Field of the Invention

The invention relates to a closet lighting system having a strip light configured around an inside perimeter of a closet door and a control system for automatically operating the light strip.

Background

Closets can often be dark and hard to find items stored therein. Sometimes closest have overhead lights but the shelving or racks of clothes block the light from reaching items stored thereunder. Overhead lights therefore are not sufficient to adequately illuminate closets. In addition, often times a person is carrying items to be place in or carried away from the closet and therefore then do not have a free hand to operate a light switch. This makes finding storing items in the closet difficult.

SUMMARY OF THE INVENTION

The invention is directed to a closet lighting system having a light strip that extends around an interior or inside perimeter of a closet doorway and that is configured to automatically turn on when an activity or motion is detected in the doorway. Motion may be that of opening or closing a door, wherein the door is configured over the closet doorway, or a person moving into a doorway, either walking or reaching into the closet. An exemplary closet lighting system comprises one or more activity sensors to detect the motion in the closet doorway. A first activity sensor may be couple to or configured proximal to the control system or the connected end of the light strip to the controller. A second activity sensor may be configured on a distal end of the light strip and may send a motion signal through the light strip, such as through a data line configured with the light strip or through an integral power line, which is a power line that provides power to the light elements, such as light emitting diodes, (LEDs). An exemplary integral power line may be a conductive line along a flexible circuit. A motion signal sent along an integral power line may be below a voltage level to activate the lights and may be sent with the light on or off. A second activity sensor may receive power from the integral power line.

In some cases, a closet has two or more doors and a light strip system may be configured with an activity sensor for each of the doors. In an exemplary embodiment, a closet has two doors, which may be sliding, swinging, double bifold doors, French doors and the like. In an exemplary embodiment, a light strip system for a double door closet has a first activity sensor on first side of the closet and configured to detect motion of the first closet door and a second activity sensor on a second side of the closet to detect motion of the second closet door. Again, any of the activity sensors may detect motion of a person moving through a doorway as well. Some closets may not have doors however, and may just have a doorway opening and the activity sensor may detect motion of a person into the doorway.

An activity sensor may be a motion detector that detects motion within a detection zone or a time-of-flight sensor that projects a beam, such as a light or laser beam, and measures the time for the beam to be reflected back off of an object to the sensor. A time-of-flight sensor may determine the location of an object, such as a door, and may determine motion of the object in a particular direction as it can determine if the object is moving away or toward the sensor. A time-of-flight sensor may be preferred as it could be used to determine the position of a door and determine if the door is opening or closing and controls may be programed to adjust the light strip as a function of the door location or motion, or lack of motion, such as a door remaining in a particular location for a period of time. For example, the light strip may turn off when the door is determined to be closed for a closed period of time.

An exemplary light strip may extend a substantial portion around an inside perimeter of a closet doorway such as along a vertical perimeter portion and/or header perimeter portion and may extend at least 51% or more of the inside perimeter of the doorway, or at least 60% or more, or at least 75% or more, or at least 90%. In an exemplary embodiment, a light strip extends from a connected end, connected to the controller, located along the base of a first side of a doorway, up along a vertical perimeter portion, along the header perimeter portion and down along the opposing vertical perimeter portion to a distal end, which may be proximal to the floor on the second side of the doorway. An exemplary light strip may be continuous from a connected end to a distal end and may emit light uniformly along this continuous light strip.

An exemplary light strip system may be configured to recognize a specific programed motion sequence of the door to turn on or off the lights, or change the brightness of the lights. For example, a person may not want the light strip on and may move a door in a specific motion, a programed motion sequence, that is recognized by the controller to deactivate the lights. For example, the door motion may be opening and closing rapidly, wherein the user can then open the door without the light strip on. Opening and closing rapidly may be a partial opening and partial closing of the door, within a rapid time frame of no more than three seconds, no more than 2 second or no more than a second, which may be a setting in the control system. A programmed motion sequence may require two motion detections of the door within a threshold time, such as within a second. After the controller detects two rapid motion signals from the activity sensor, the lights may be deactivated or turned off and may not be able to turn back on due to motion detected for a delay time, such as about one minute or more, about two minutes or more, about five minutes or more and any range between and including the times provided. A control system may include a user input feature to enable the user to set a delay time. In addition, a user input feature may enable a user to set a specific programed motion sequence for controlling the light strip. A user may program the lights to come on a dim setting as they may want a dim light from the closet to help them maneuver around the room at night. In another example, a user may program a programed motion sequence to turn the lights on full bright for a period of time.

An exemplary light strip may provide a uniform light into the closet and may also act as a wire, delivering power unidirectionally from the control system to the distal end of the light strip and in some cases to a second sensor configured along the light strip or on a distal end of the light strip. In addition, a light strip may enable bidirectional transfer of data between the control system on one end and sensors, motion and/or light sensors, configured along the light strip or configured on a distal end of the light strip. Power delivery to these distal components or sensors may be accomplished even when the light strip is off or unlit by transmitting voltage below a threshold voltage which turns on the lights, such as below about 5V when using a 12V light strip. Data may be transferred through the integral power line by varying the transmitted voltage in a predefined "language" or wave form, understood by both control system and distal devices, such as a motion and/or light sensor; much like Morse code. Two versions of the same language would exist: low-voltage for when the light strip is off or unlit, and high-voltage for when the light strip is on or lit. Small voltage variations when the light strip is lit would not cause an appreciable effect in light output. Data transfer may be accomplished in the distal to proximal direction by adding an electrical load to the end of the light strip, again in a predefined "language", which is detected at the proximal end or on the control system end. Possibilities for detection parameters by the controller include an increase in current when the light strip are unlit, adding a distal load causes current to increase, or a voltage drop when the light strip is lit, adding a distal load causes voltage to drop.

An exemplary light strip may comprise one or more light elements. In one embodiment, a light strip is a continuous light element and, in another embodiment, a light strip comprises a plurality of light elements spaced along the light strip; often times in uniform intervals to produce a substantially uniform light. A light strip may incorporate light emitting diodes (LEDs) that are highly efficient and can produce a high lumen light.

An exemplary light strip may be powered by an electrical plug or batteries. One or more batteries may be configured in a battery pack. The batteries may be rechargeable batteries and the battery pack may be configured for quick exchange with a charged battery pack when the state of charge drops below a threshold level.

An exemplary controller may be coupled wirelessly a remote electronic device, such as a mobile phone to enable control of the closet lighting system from the remote electronic device, such as turning on and off the light strip, or changing the intensity of the lights. In addition, an alert may be sent to the remote electronic device when the battery drops below a threshold state of charge. The user of the system may then exchange the battery pack. A wireless signal, such as a Bluetooth signal, may be used communicate with a router or directly with a remote electronic device.

Definitions

A closet, as used herein, is an enclosed space that has a doorway opening for people to access items in the closet and in some cases to walk through the doorway into the closet; a closet may have a door configured over the doorway and the door may open to provide access to the closet.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 4 shows a closet side view of the closet doorway shown in FIG. 3, with the second doorway slid open and the light strip automatically turned on.

Figure 1:
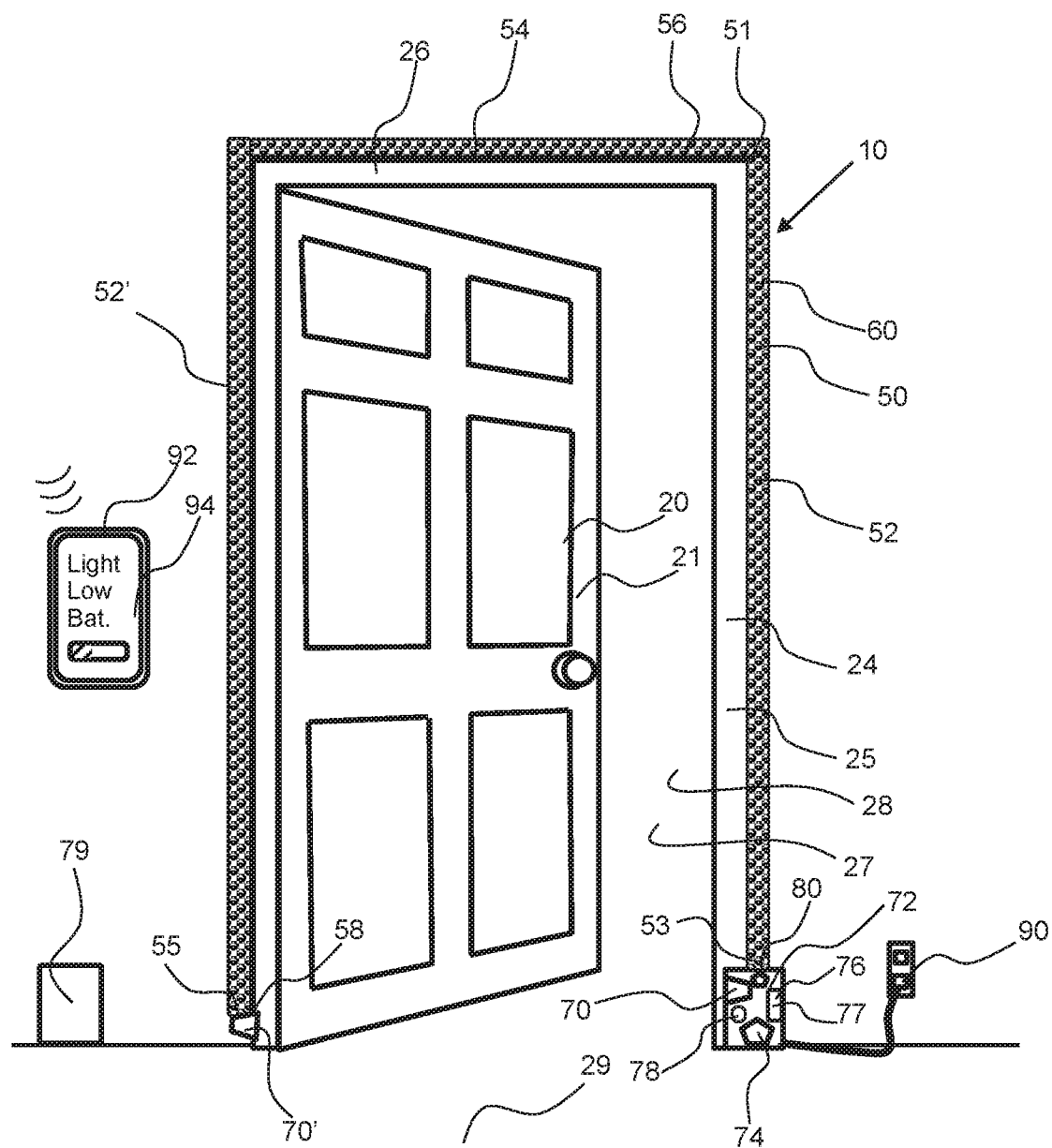
FIG. 1 shows a closet side view of a closet doorway having an exemplary closet lighting system to detect motion in the closet doorway and automatically turn on a light strip configured around the perimeter of the doorway.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
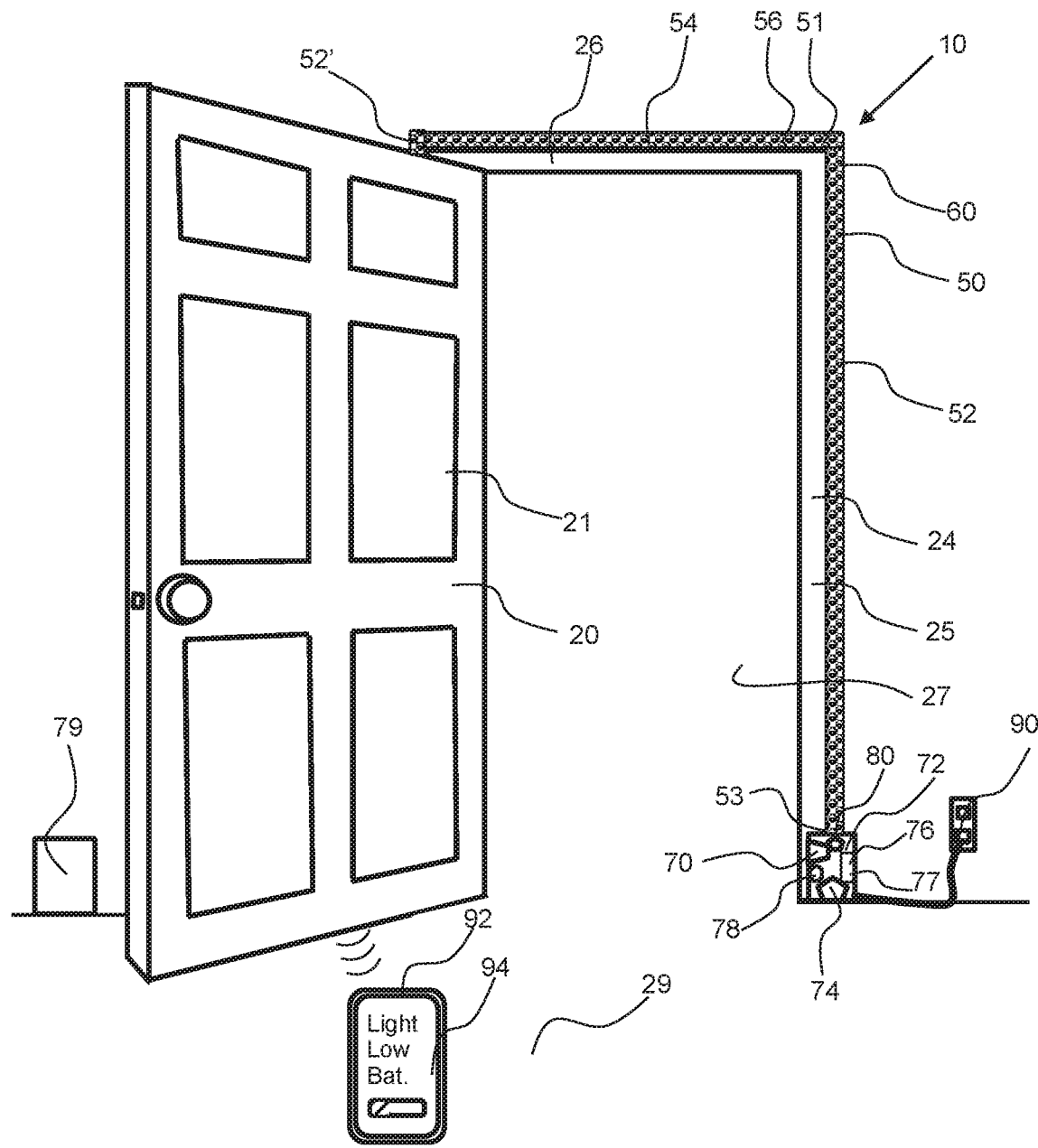
FIG. 2 shows a closet side view of a closet doorway having an exemplary closet lighting system to detect motion in the closet doorway and automatically turn on a light strip configured around the perimeter of the doorway.

Referring now to FIGS. 1 and 2, an exemplary closet lighting system 10 is configured on an inside perimeter of a closet doorway 27 having a swinging door 21 and has an activity sensor 70 configured to detect motion in the doorway, such as a person moving in the doorway opening 28 or the closet door 20 opening or closing. The activity sensor is configured on or with the controller 74 and provides a motion signal to the controller when motion is detected. The controller 74 automatically turns on the light strip 50 when motion in the doorway is detected by the activity sensor. The light strip 50 has a connected end 53, connected with the controller, and a distal end 55 that is extended from the controller. As shown the connected end is at the base of one side of the doorway and the distal end is at the base of the opposing side of the doorway. An exemplary light strip may have a plurality of lights 51 that receive power from an integral power line 60 extending along the light strip. Power may be from a battery 76 or from an electrical plug 90 coupled to an outlet and to the control system 72. A battery or batteries may be rechargeable batteries. An exemplary battery may be a battery pack 77 that is configured to be interchanged with a charged battery pack when the state of charge drops below a threshold level. The controller may have a battery indicator light or lights to display the state of charge of the battery, such as green, yellow and red lights.

An exemplary controller 74 may be coupled wirelessly a remote electronic device 92, such as a mobile phone 94 to enable control of the closet lighting system from the remote electronic device, such as turning on and off the light strip, or changing the intensity of the lights. In addition, an alert may be sent to the remote electronic device when the battery drops below a threshold state of charge. The user of the system may then exchange the battery pack. A wireless transceiver 78, utilizing Bluetooth signals for example, may be coupled with a router 79. The remote electronic device may receive signals from the router directly or indirectly.

The light strip extends substantially around the doorway perimeter 24 of the closet 29, such as along the two vertical perimeter portions, 25, 25' and along the header perimeter portion 26 or along on vertical perimeter portion and the header perimeter portion. The light strip may be a continuous strip extending from the connected end 53, connected to the control system, and having a vertical light strip portion 52, 52' extending along the two vertical perimeter portions 25, 25' and a header light strip portion 54 extending along the header perimeter portion 26 of the doorway perimeter. An exemplary light strip extends substantially around the perimeter, or at least around 51% of the perimeter or more, or at least 75% of the perimeter or more and preferably at least 85% of the perimeter of the doorway or more.

An exemplary light strip system may comprise a second activity sensor 70' to detect motion in the doorway such as a person or movement of the door. A second activity sensor may be coupled to the distal end 55 of the light strip and may have a second sensor coupler 58, coupling the second activity sensor to the light strip. The second activity sensor may send a motion signal through a data line 56 that may extend along the light strip or along the integral power line 60 of the light strip. The second activity sensor may send a signal along the integral power line that is below a threshold level for activating the lights and the second activity sensor may draw electrical power from the integral power line.

An exemplary light strip system may comprise a light sensor 80 that may provide light signal input to the control. The controller 74 may adjust the brightness of the light emitted from the light strip as a function of the light signal. If the light signal input is above some upper threshold level, the light output may be reduced, as excess light may not be required.

Figure 3:
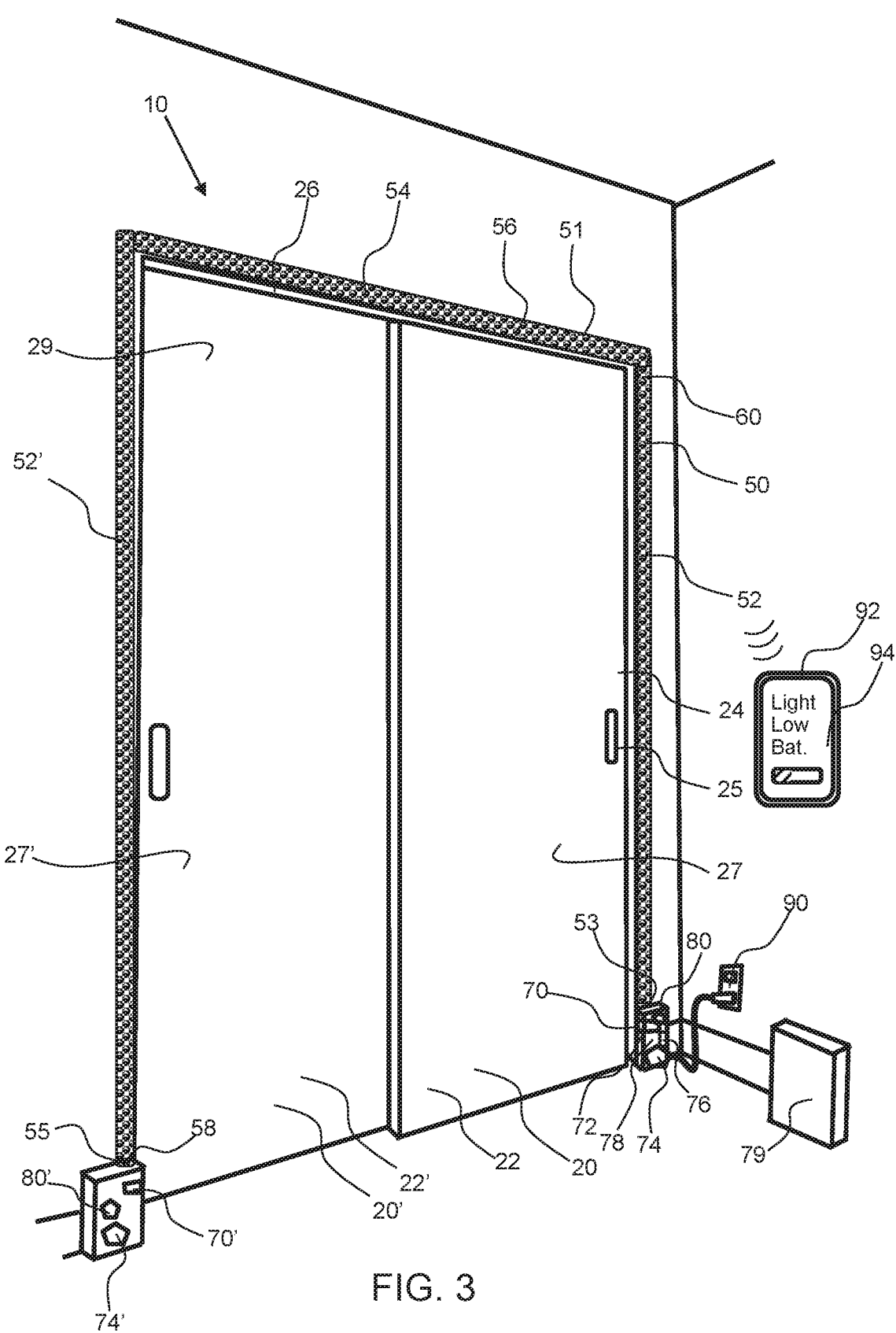
FIG. 3 shows a closet side view of a closet doorway having two sliding doors and therefore two closet doorways and an exemplary closet lighting system to detect motion in the closet doorway and automatically turn on a light strip configured around the perimeter of the doorway.
Figure 4:
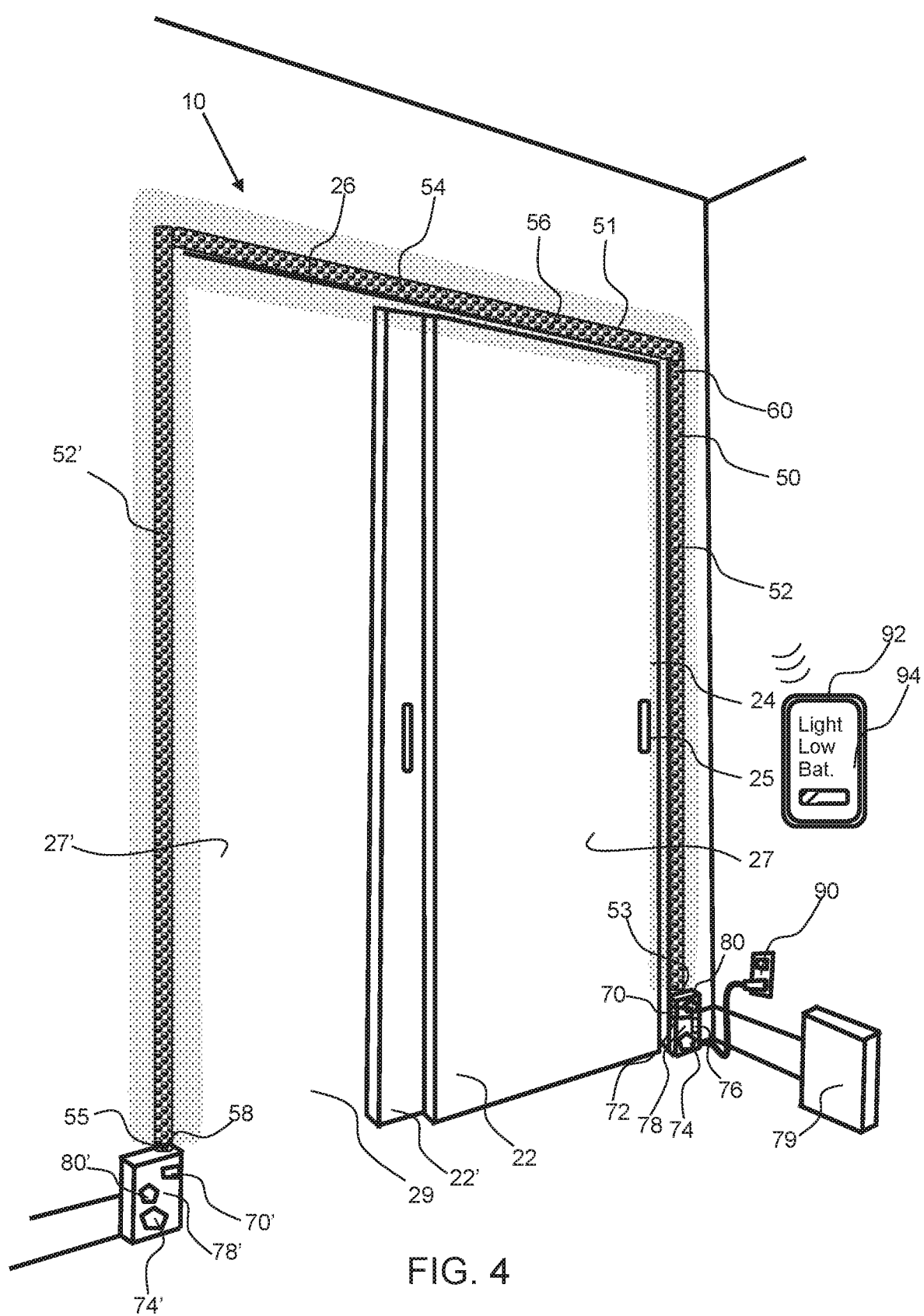

An exemplary control system 72 may be configured to turn off the light strip in the event of a programed motion sequence such as the door being opened and closed rapidly. A user may do this to turn off the lights in the event they do not want them on when entering the closet. A delay time may be set before the lights will turn on again due to motion Referring now to FIGS. 3 and 4, a closet 29 is configured with two closet doors 20, 20' and therefore two closet doorways 27, 27'. The two sliding closet doors 22, 22' open from opposing sides and therefore a single activity sensor may not detect the motion of both doors. Therefore, a second activity sensor 70' is configured to detect motion in the second doorway 27', such as the second closet door 20' or a person moving in the second doorway. The second activity sensor may send a motion detection signal to the control system 72, located on the opposing side of the closet, or along the vertical perimeter of the first closet doorway 27. The motion detection signal may be sent along the light strip via a data-line 56 or through the power-line 60, wherein the motion signal is below a threshold voltage to activate the lights of the light trip. As shown in FIG. 4, the second closet door 20' is opened and the second activity sensor 70' has detected the motion and sent a motion signal to the control system 72 to automatically turn on the light strip 50. Power may be from batteries 76 or from an electrical plug 90 coupled to an outlet and to the control system 72. Batteries may be rechargeable batteries and may be interchangeable battery packs.

As described herein, an exemplary light strip system may comprise a light sensor 80 that may provide light signal input to the control. The controller 74 may adjust the brightness of the light emitted from the light strip as a function of the light signal. If the light signal input is above some upper threshold level, the light output may be reduced, as excess light may not be required.

As described herein, an exemplary control system 72 may be configured to turn off the light strip in the event of a programed motion sequence being detected by the activity sensor, such as the door being opened and closed rapidly. The first or second activity sensor may provide a motion signal of the door opening and closing rapidly for example. A user may do this to turn off the lights in the event they do not want them on when entering the closet. A delay time may be set before the lights will turn on again due to motion. A user may be able to set a particular programed motion sequence for turning the lights on and off, such as open close rapidly or open close open close.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of illuminating a space, comprising:
   providing a light strip system, including:
      a light strip disposed adjacent to an inside perimeter of a doorway of the space, on an interior-facing surface, such that a light emitting surface of the light strip is oriented into the space;
      a control system configured to control turning on and off the light strip; and
      a first activity sensor configured to detect motion in a first side of the doorway and to provide a signal to the control system in response to detecting motion;
   detecting motion in the closet doorway with one of the first activity sensor;
   sending a first signal to the control system from the first activity sensor in response to detecting motion in the doorway; and
   turning on the light strip with using the control system.

2. The method of claim 1, wherein the light strip defines a proximal end and a distal end, and the control system is disposed at the proximal end of the light strip.

3. The method of claim 1, wherein the light strip defines a proximal end and a distal end, the first activity sensor is disposed at the proximal end of the light strip, and a second activity sensor is disposed at the distal end of the light strip.

4. The method of claim 1, wherein the light strip extends around at least 51% of the inside perimeter of the doorway.

5. The method of claim 4, wherein the light strip extends around at least 90% of the perimeter of the doorway.

6. The method of claim 3, wherein the space is a closet having two sliding doors, and detecting motion in the doorway includes detecting a sliding motion of one of the sliding doors with a corresponding one of the activity sensors.

7. The method of claim 3, wherein the space is a closet having two French doors, and detecting motion in the doorway includes detecting an opening motion of one of the French doors with a corresponding one of the activity sensors.

8. The method of claim 3, wherein the space is a closet having two bifold doors, and detecting motion in the doorway includes detecting an opening motion of one of the bifold doors with a corresponding one of the activity sensors.

9. The method of claim 1, wherein the space has no doors, and detecting motion in the doorway includes detecting motion of a person into the doorway.

10. The method of claim 1, wherein the control system is configured to deactivate the light strip in response to a programmed motion sequence of a door of the space.

11. A method of installing a light strip system for illuminating a space, comprising:
    disposing a light strip adjacent to an inside perimeter of a doorway of the space, on an interior-facing surface, such that a light emitting surface of the light strip is oriented into the space;
    providing a control system connected to the light strip, wherein the control system is configured to control turning on and off the light strip; and
    providing a first activity sensor connected to the light strip, wherein the first activity sensor is configured to detect motion in a first side of the doorway and to provide a signal to the control system in response to detecting motion.

12. The method of claim 11, wherein the control system is disposed at one end of the light strip.

13. The method of claim 11, wherein the first activity sensor is disposed at a first end of the light strip, and a second activity sensor is disposed at a second end of the light strip.

14. The method of claim 11, wherein the light strip extends around at least 51% of the inside perimeter of the doorway.

15. The method of claim 13, wherein the space has two doors, and the first and second activity sensors are each configured to detect an opening motion of a corresponding one of the doors.

16. The method of claim 13, wherein the space has no doors, and the first and second activity sensors are each configured to detect motion of a person into a corresponding side of the doorway.

17. A method of providing a space illumination system, comprising:
    installing a light strip around at least 51% of an area adjacent to an inside perimeter of a doorway of the space, on an interior-facing surface, such that a light emitting surface of the light strip is oriented into the space;
    providing power to a control system configured to control turning on and off the light strip; and
    connecting a first activity sensor to the light strip, wherein the first activity sensor is configured to detect motion in a first side of the doorway and to provide a signal to the control system in response to detecting motion.

18. The method of claim 17, wherein the first activity sensor is disposed at a proximal end of the light strip and a second activity sensor is disposed at a distal end of the light strip.

19. The method of claim 18, wherein the light strip delivers power to the second activity sensor.

20. The method of claim 17, wherein the first and second activity sensors are each configured to detect an opening motion of a corresponding door of the space.

* * * * *

UNITED STATES PATENT AND TRADEMARK OFFICE
CERTIFICATE OF CORRECTION

| | | Page 1 of 1 |
|---|---|---|
| PATENT NO. | : 11,284,495 B2 | |
| APPLICATION NO. | : 17/027560 | |
| DATED | : March 22, 2022 | |
| INVENTOR(S) | : Christopher Stubbs | |

It is certified that error appears in the above-identified patent and that said Letters Patent is hereby corrected as shown below:

In the Claims

Column 6, Lines 62-63, Claim 1: the text "detecting motion in the closet doorway with one of the first activity sensor;" should read --detecting motion in the doorway with the first activity sensor;--.

Column 6, Line 67, Claim 1: the text "turning on the light strip with using the control system." should read --turning on the light strip using the control system.--.

Signed and Sealed this
Thirty-first Day of May, 2022

Katherine Kelly Vidal
*Director of the United States Patent and Trademark Office*